United States Patent [19]

Suzuki et al.

[11] 4,370,910

[45] Feb. 1, 1983

[54] METHOD AND APPARATUS FOR CUTTING METAL PIECES INTO NARROWER WIDTHS

[75] Inventors: Yasuo Suzuki; Shuji Nagata; Kazumi Yasuda, all of Kitakyushu, Japan

[73] Assignee: Nippon Steel Corporation, Tokyo, Japan

[21] Appl. No.: 221,413

[22] Filed: Dec. 30, 1980

[51] Int. Cl.³ .............................................. B23D 19/06
[52] U.S. Cl. .................................. 83/876; 72/203; 83/864; 83/887; 83/15; 83/56; 83/676
[58] Field of Search ............... 72/203, 204, 221; 83/863, 864, 865, 875, 876, 877, 878, 879–887, 56, 676, 15

[56] References Cited

U.S. PATENT DOCUMENTS

| 1,910,271 | 5/1933 | Williams | 72/204 X |
| 2,053,375 | 9/1936 | Nicholas | 83/863 X |

FOREIGN PATENT DOCUMENTS

| 871396 | 3/1953 | Fed. Rep. of Germany | 83/884 |
| 1220791 | 1/1960 | France | 83/879 |
| 593840 | 2/1978 | U.S.S.R. | 83/676 |

Primary Examiner—James M. Meister
Attorney, Agent, or Firm—Wenderoth, Lind & Ponack

[57] ABSTRACT

Using a pair of driven knifing rolls having annular wedges therearound, one above the other, a relatively hot metal piece having a rectangular cross-section is cut into three or more narrower widths. The annular wedges hold and bite into the metal piece being transferred in the longitudinal direction thereof, thus forming V-shaped grooves in the metal. The angle formed between that flank which is closer to the as-cast side of the metal piece to be cut, upon which no cutting force is exerted, and a perpendicular to the roll axis is greater than the angle formed between the opposite flank and the same perpendicular, so that the cross-sectional shape of the annular wedge is asymmetrical with respect to a line segment that passes through the pointed end of the wedge and extends perpendicular to the axis of the rolls.

2 Claims, 10 Drawing Figures

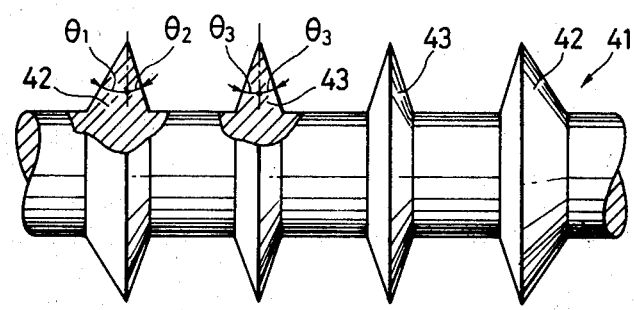
FIG. 5
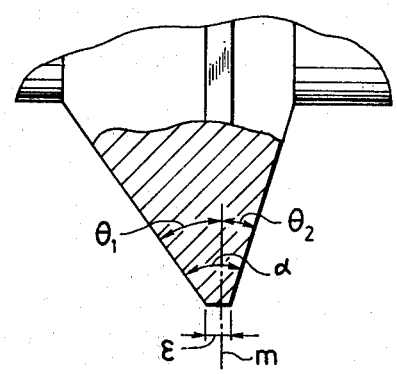
FIG. 6
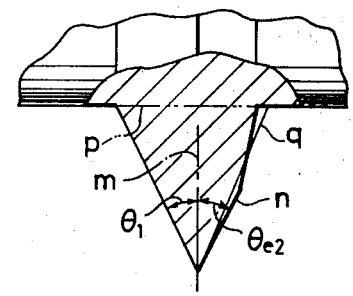
FIG. 7
FIG. 8
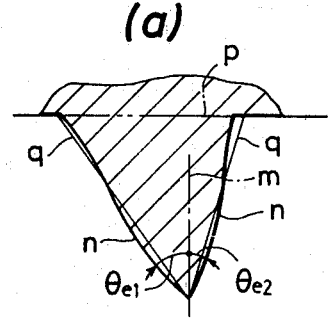
(a)
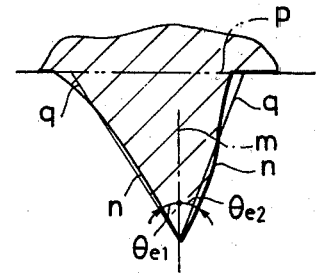
(b)

METHOD AND APPARATUS FOR CUTTING METAL PIECES INTO NARROWER WIDTHS

BACKGROUND OF THE INVENTION AND PRIOR ART

This invention relates to a method and apparatus for cutting metal pieces, and more particularly to a method and apparatus for longitudinally cutting relatively long, hot metal pieces having a rectangular cross-section, such as continuous-cast steel slabs, into narrower widths.

Conventionally, steel products have been manufactured by following a sequence of operations as follows: first, molten steel refined in a steel-making furnace is poured into molds to solidify into ingots. The thus molded ingots are uniformly heated in a soaking pit, and then rolled into semi-finished steel. After cooling and surface conditioning, the semi-finished steel is reheated and rolled into the desired finished products.

In another process which has recently come into wider use, molten steel is continuously cast from the steel-making furnace directly into semi-finished shapes (or cast sections).

To increase the equipment utilization rate and productivity of the continuous casting process, it is necessary to decrease the variety of cast section sizes and increase the casting tonnage of each size to the greatest possible extent. Actually, however, rolled products, such as cold-rolled sheets, ordered by customers vary widely in thickness, width and so on.

To meet this demand by continuous casting, as many molds as are equivalent to the number of sizes, especially widths, ordered must be prepared, and such molds must be changed frequently. The frequent changing of the continuous casting molds, by the nature of things, takes up considerable time, thus reducing the operating time of the continuous caster. Then, a decrease in equipment utilization rate, equipment and labor productivity occurs.

There has been proposed a technique to overcome this problem by varying the width of the mold during the continuous casting operation. But to continuous-cast a slab with a width one-half the maximum possible width, for example, cuts the productivity in half. So this proposal is far from being a good solution.

To solve the problem more completely, as many different widths as possible should be grouped and rolled in a single piece, the width of which is that of the widest in the group, and the continuous cast piece then cut into the desired widths by some appropriate means.

In the conventional ingot producing process, various sizes of semi-finished steel products have been produced in the primary-mill stage. The continuous casting process, however, lacks this capacity to produce assorted sizes, except by changing the mold used therein. Thus, the practice has been to continuously cast a wide piece first, and then cut it into narrower widths later.

An example of a specific technique for carrying out this width-dividing operation is gas cutting in the longitudinal direction of the cast piece. Another example is disclosed in Japanese Patent Publication No. 83023 of 1976, in which a cast piece is passed between a pair of horizontal rolls each having an annular projection or projections therearound and disposed one above the other. As a consequence, a groove or grooves, having a V-shaped (or wedge-shaped) cross-section, are formed in the longitudinal direction of the piece. Then, the small thickness of metal left between the innermost points of the grooves in the top and bottom surfaces of the piece is gas-cut.

These methods make it possible to obtain semi-finished steel in various widths by longitudinally cutting a single width material. But gas cutting melts away a considerable amount of metal as slag, thereby decreasing the yield of the process. The low cutting speed results in the heat dissipating from the piece during cutting. This impedes the effective utilization of the sensible heat which the piece contains after casting and, therefore, reduces any saving of reheating energy for the subsequent rolling process. Gas cutting also exposes the coarse-grained structure within the cast section, which, being subsequently oxidized, remains as defects in the finished products.

Accordingly, still another method has been developed to cut a single width of material into two or more narrower widths without employing gas cutting. This method comprises cutting a groove or grooves having a V-shaped (or wedge-shaped) cross-section in each surface of the piece by passing the piece between a pair of horizontal rolls each having an annular projection or projections therearound and placed one above the other. By repeating this process, the top and bottom grooves are deepened gradually until the innermost points thereof meet to accomplish the cutting.

In longitudinally cutting a piece into three or more widths according to the last-described method, two variations are conceivable. A first method is to continue bisecting the widths until the desired number of sections are obtained. A second method is to cut the piece into the desired number of sections all at the same time. The first method has some shortcomings. When a piece is bisected, the halved sections each become cambered. It is very difficult, from a practical standpoint, to make longitudinal cut along such a cambered surface. Besides, the frequent passage through the cutting equipment lowers production efficiency. Even so, the second method surpasses the first in efficiency.

However, cutting a long piece of metal, such as a steel slab, longitudinally, into three or more narrower widths at one time, by using a pair of horizontal rolls having annular projections therearound, is also not without problems. A section through a piece having both sides of the original piece, i.e. a section to which the cutting force of the annular projection has not been applied, looks somewhat like an asymmetrical dogbone in cross-section, varying in thickness across the width. If such a piece is rolled through paired horizontal rolls for thickness reduction, the resulting product will have a large camber since the metal is elongated in varying amounts at different parts of the width. This camber not only makes the subsequent rolling difficult, but also lowers the quality of the finished product.

In cutting a flat piece of metal, such as a steel slab, with the paired rolls having annular projections therearound, care should be taken so that all cut sections have a symmetrical cross-section or their thickness irregularities across the width thereof should be minimized.

SUMMARY OF THE INVENTION

This invention solves the problems which arise in cutting a metal piece into narrower widths.

An object of this invention is to provide a method and apparatus for cutting a metal piece into three or more narrower widths with high efficiency.

Another object of this invention is to provide a method and apparatus for cutting a metal piece into narrower widths so that the resulting camber of the cut section is minimized to such an extent that it does not impede subsequent rolling operation and reduce the quality of the finished product.

The method of longitudinally cutting a relatively long piece of hot metal having a rectangular cross-section into three or more narrower widths comprises passing the piece longitudinally through a pair of driven knifing rolls positioned one above the other and having annular wedges therearound so that the wedges bite into the top and bottom surfaces of the piece to cut wedge- or V-shaped grooves therein. That groove which lies nearest to either as-cast side of the original piece to be cut, namely the side upon which no cutting force is exerted, is so shaped that the flank thereof which is nearer that side is tapered at a greater angle with respect to a perpendicular, than the opposite flank.

To form such a groove, the corresponding annular wedge has a cross-section that is asymmetrical with respect to a perpendicular that passes through the pointed end of the wedge and extends at right angles to the roll axis. Namely, the flank of the wedge nearest the as-cast side of the original piece to be cut is tapered at a greater angle than the other flank.

When cut according to the above-described method, the cut section containing the as-cast side of the original piece will have a cross-section as follows. The cut side of this section, namely the one on the opposite side of the piece from the as-cast side, is rolled by that flank of the wedge which is tapered at a greater angle. With the osculating plane including a considerable amount of horizontal component, the part rolled by the bluntly tapered wedge flank resembles a plate rolled by ordinary paired rolls. Accordingly, the metal in this part flows in the longitudinal direction of the section, restraining any increase in thickness. The result is a cross-section having a minimum of thickness variation across the width thereof.

Consequently, even the cut section containing the as-cast side of the original piece does not have any significant curvature when subjected to the subsequent rolling between the paired horizontal rolls. This reduces the rolling frequency and enhances productivity. The limited widthwise metal flow increases the accuracy of cutting.

Both sides of a cut section not containing the as-cast side of the original piece are rolled by the other flank of the wedge which is tapered at a smaller angle or more acutely. Therefore, the metal builds up in such areas. This buildup is substantially symmetrical with respect to the longitudinal axis of such a cut section, so that no detrimental curvature results from the subsequent thickness reduction rolling between the paired horizontal rolls.

BRIEF DESCRIPTION OF THE DRAWINGS

FIG. 5 is a cross-sectional view showing an embodiment of a knifing roll according to this invention;

FIG. 6 is a detailed cross-sectional view, or an enlarged scale, showing an annular wedge provided around the knifing roll according to the invention;

FIG. 7 is a cross-sectional view similar to FIG. 6 of an annular wedge having one flank with a contour constituted by a bent line, with the outer flank being tapered at a greater angle than the parts of the inner flank;

FIGS. 8a and 8b are cross-sectional views of annular wedges, flanks of which have contours which are curved lines, FIG. 8a showing a wedge in which the outer and inner flanks are both convex, and FIG. 8b showing a wedge in which the outer flank is concave and inner flank is convex;

DETAILED DESCRIPTION OF THE PREFERRED EMBODIMENTS

Figure 1:
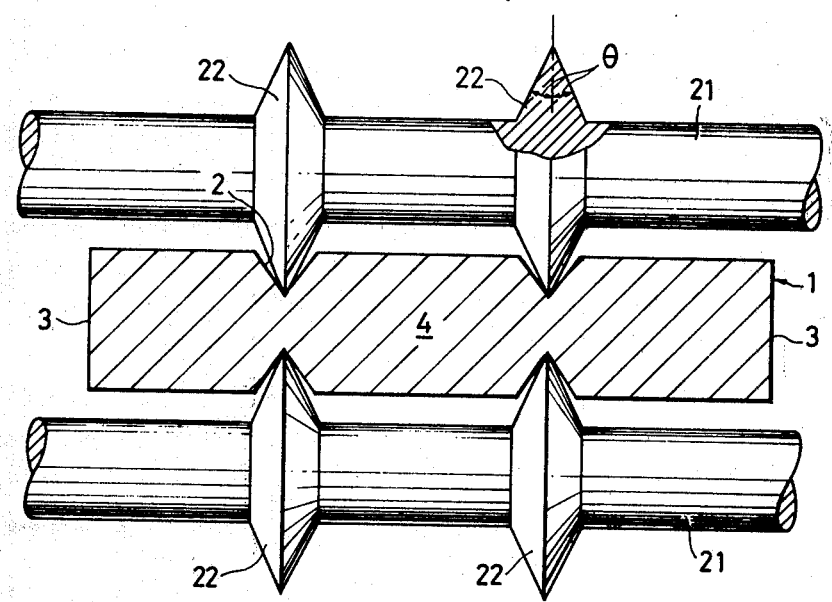
FIG. 1 is a schematic sectional view showing the way in which a metal piece is cut into narrower widths by using a pair of conventional rolls having annular wedges therearound.

FIG. 1 shows a conventional way of cutting a relatively hot metal piece into narrower widths. As shown, an annular projection 22 provided around a knifing roll 21 has a cross-section in the form of an annular wedge, with both flanks thereof tapered at the same angle 8. Therefore, the wedge 22 has a symmetrical cross-sectional shape. Two such knifing rolls 21 are provided, one placed above the other, and are driven, and a metal piece 1 traveling in the longitudinal direction thereof is passed between the paired knifing rolls 21. As a consequence, the wedges 22 cut into the top and bottom surfaces of the metal piece to form V-shaped grooves 2 therein. Generally, the metal piece 1 is passed repeatedly through the rolls 21 so that the groove 2 is deepened stepwise until cutting is accomplished. This cutting is carried out at high temperatures. When the metal piece is steel, for example, the cutting temperature ranges between 700° and 1300° C.

Figure 2:
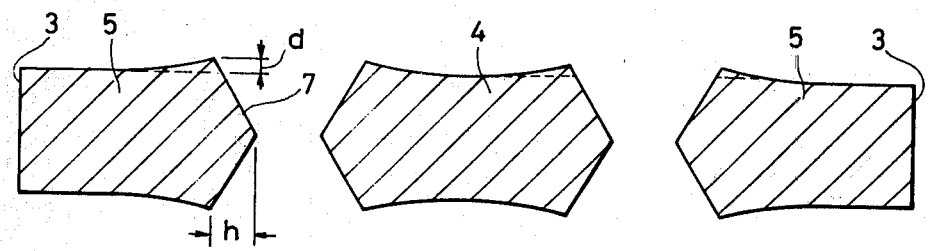
FIG. 2 is a cross-sectional view showing three sections cut from a wider metal piece by using the paired conventional rolls shown in FIG. 1 and having annular wedges therearound.

FIG. 2 shows generally the cross-sectional shapes of the three sections into which a wide metal piece is divided by means of paired knifing rolls having annular wedges therearound as shown in FIG. 1. As seen, the middle section 4 has a substantially symmetrical thickness variation with respect to the central axis thereof. As compared to this, the thickness variation distribution in the cut side sections 5, each of which contains one side 3 of the original metal piece upon which no cutting force has been exerted (hereinafter called a free side 3), has a tendency to increase toward the cut side 7. This unsymmetrical thickness variation is pronounced when the metal piece is cut in the above-described conventional manner.

With a view to finding a method of cutting a metal piece into three or more narrower widths using paired knifing rolls having annular wedges and without causing such an unbalanced variation in thickness, the inventors made many experiments to throw light upon the mechanism by which such unbalanced variation of thickness occurs. These studies have revealed the following fact. When a wide metal piece, such as a steel slab, is cut into three or more narrower widths by a method such as shown in FIG. 1, the knifing action of the annular wedge 22 displaces the metal to form a groove in the shape of the letter V. The displaced metal flows in the longitudinal direction of the metal piece 1 and, at the same time, builds up in the direction of the thickness. As a consequence of this build-up, each of the two side cut sections 5, each having a free side 3, becomes thicker toward the cut side 7, to which the knifing action has been applied, and thinner toward the free side 3.

Figure 3:
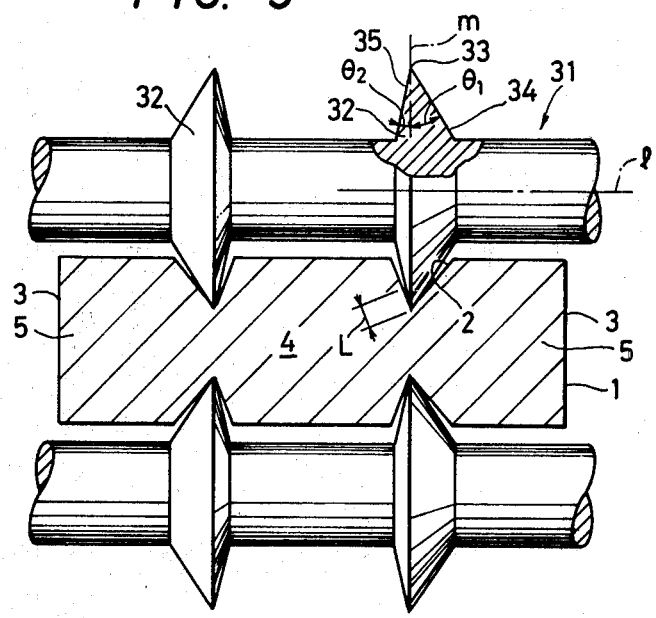
FIG. 3 is a schematic sectional view showing the way in which a metal piece is cut into narrower widths by the method and apparatus according to this invention.

Based on the above knowledge, the inventors have found that such unbalanced variation in thickness can be eliminated by making the cross-sectional shape of the annular wedge 32 that cuts off the section containing the free side 3 asymetrical as shown in FIG. 3. Thus FIG. 3 shows an embodiment in which each knifing roll 31 has two annular wedges 32 to cut the metal piece 1 into three sections. The angles (wedge flank angles) $\theta_1$ and $\theta_2$ formed between a vertical line m, which passes through the pointed end 33 of the profile of the wedge 32 and extends perpendicular to the axis l of the knifing roll 31, and flanks 34 and 35 are different from each other. The angle $\theta_1$ formed by the flank near the free side 3 (hereafter called the outer flank 34) is larger than the angle $\theta_2$ formed by the adjacent opposite flank (hereinafter called the inner flank 35).

The horizontal component of the length of contact L between the wedge 32 and the metal piece can be expressed as L sin $\theta_1$ or L sin $\theta_2$. Thus, in the annular wedge shaped projections 32 as described above, the horizontal component of the length of contact is greater for the outer flank 34 than for the inner flank 35. Accordingly, that part of the metal piece which contacts the outer flank 34 resembles a plate being rolled between oridinary horizontal rolls. As is well known, in ordinary plate rolling, metal flows mostly in the direction of rolling. By increasing the angle $\theta_1$ of the outer flank 34, more metal is caused to flow in the direction in which the groove 2 extends where the outer flank 34 contacts the plate, thus reducing the thickness buildup in the metal piece 1. As a consequence, the unbalanced variation in thickness can be reduced to an extent such that no significant curvature results in the succeeding thickness-reduction rolling process.

Owing to the small inner flank angle $\theta_2$, the middle cut section 4 develops a considerably great metal buildup. This metal buildup develops substantially symmetrically across the width, so that no curvature results when the cut section 4 is subjected to a thickness-reduction rolling through horizontal rolls.

Figure 4:
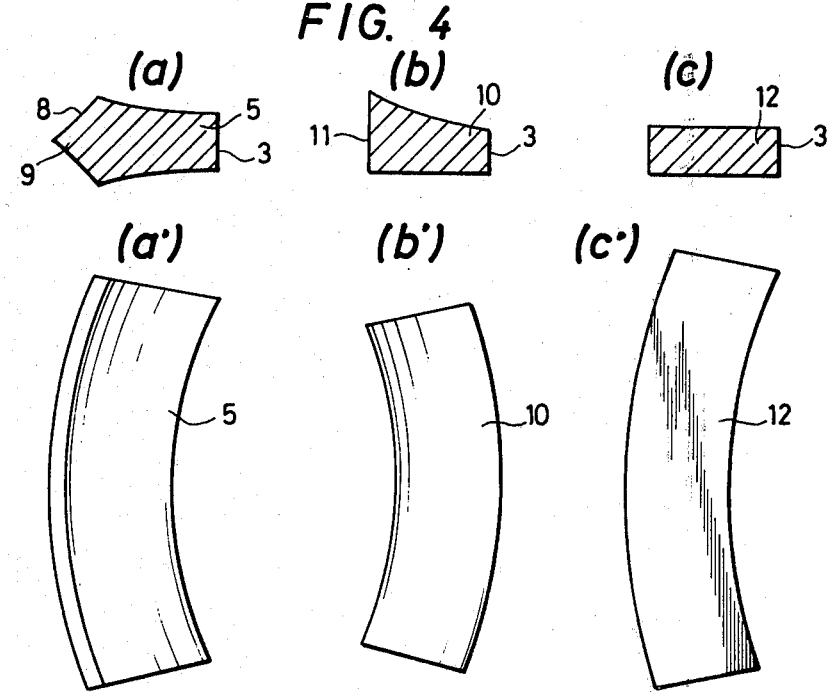
FIGS. 4a and 4a' are section and plan views of a cut section in an as-cut condition.
FIGS. 4b and 4b' are section and plan views of the same section with both sides edged.
FIGS. 4c and 4c' are section and plan views of the same section after it has been flattened by being passed through a pair of horizontal rolls.

After cutting a relatively hot wide metal piece, such as a steel slab, into narrower widths according to the above method, edging is carried out to flatten the side of the cut section having a projection thereon due to the cutting. Then, the edged section is subjected to a thickness-reduction rolling through paired horizontal rolls. The parts of FIG. 4 show how this sequence of operations takes place on a conventional outer cut section 5. The cut section 5 in this illustration is the one at the right in FIG. 2.

FIG. 4a is a cross-section of a cut section 5 in the as-cut condition, having a cut side 8 with a projection 9 and a flat free side 3. In this condition, the section 5 is greatly curved as shown in 4a'.

FIG. 4b is a cross-section of a cut section 10 after edging has been carried out on both sides 3 and 11 by a pair of vertical rolls to eliminate the projection 9. Because the edging action is applied to both sides 3 and 8, the flat free side 3 elongates more than the cut side 8 having the projection 9. Therefore, the curvature of the edged section is reversed from that shown in FIG. 4a', as shown in FIG. 4b'.

FIG. 4c is a cross-section of a cut section 12 having a uniform thickness, as a result of a thickness-reduction rolling of the edged section 10 by a pair of horizontal rolls. During this rolling, the thicker part is elongated more than the thinner part, so that the curvature of the flat-rolled section 12 is reversed again from that shown in FIG. 4b', as shown in FIG. 4c'.

It is necessary for efficient production that the unsymmetrical thickness variation in the cut section 5 be reduced to such an extent that the curvature in this stage, i.e., in FIGS. 4c and 4c', can be reduced substantially to zero. By choosing appropriate flank angles $\theta_1$ and $\theta_2$ for the annular wedge, this invention makes it possible to reduce the lack of symmetry in the thickness variation as desired.

The foregoing description is of an embodiment in which the metal piece is cut into three sections. The same is true for instances in which the metal is cut into four or more sections. The annular wedge cutting an outer section containing a free side is given a greater flank angle on the outside than on the inside. The annular wedge cutting a section having two cut sides has equally angled outer and inner flanks. FIG. 5 shows an example of such a knifing roll. Used for cutting a metal piece into five sections, this knifing roll 41 has two outer annular wedges 42 on opposite end portions and two inner annular wedges 43 therebetween. On each outer annular wedge 42, the outer flank angle $\theta_1$ is greater than the inner flank angle $\theta_2$. On the inner annular wedge 43, the angle $\theta_3$ of both outer and inner flanks is equal to the inner flank angle $\theta_2$ of the outer annular wedges.

FIG. 6 is a detailed cross-sectional view of an annular wedge for cutting off a section with a free side. To achieve a greater effect according to this invention, the greater the outer flank angle $\theta_1$, the more desirable, provided that the angle $\alpha$ at the apex of the wedge $(=\theta_1+\theta_2)$ falls within the range of 30° to 90°. If the wedge apex angle $\alpha$ exceeds 90°, the height (designated by reference character h in FIG. 2) of the roof-shaped projection at the side of the cut becomes so great that many edging passes are required to eliminate that projection in the subsequent processes. In addition, when cutting with such a wedge, the knifing roll is subjected to such a great reaction that the cutting device must be large enough to withstand it. Besides, the desired V-shaped groove cannot be made unless the metal piece is passed many times between the knifing rolls, impairing the efficiency of the operation. On the other hand, if the wedge apex angle $\alpha$ is smaller than 30°, the annular wedge does not have adequate strength and wears away rapidly.

The wedge apex angle $\alpha$, falling within the range of 30° to 90°, is divided into the outer flank angle $\theta_1$ and inner flank angle $\theta_2$. The values of these angles must be such that the resulting variation in thickness in the cut piece is small enough not to cause any significant curvature in the cut section 12 in the rolled stage corresponding to FIG. 4c'. According to the experimental studies of the inventors, the angle $\theta_1$ should preferably fall within the range of $0.52\alpha$ to $0.92\alpha$.

If the maximum thickness of the metal piece is H, high cutting efficiency is obtained when the width $\epsilon$ of the pointed end of the wedge is less than or equal to 0.05H ($\epsilon \leq 0.05H$), or preferably equal to 0.01H to 0.04H ($\epsilon = 0.01H$ to 0.04H).

In the foregoing description, the wedge flanks have contours which consist of straight lines, but this invention is by no means limited thereto. For example, the flank contour may be bent or curved lines, as well. FIG. 7 shows an embodiment having a flank contour constituted by a bent line. FIGS. 8a and 8b show embodiments in which the flank contours are constituted by curved lines. The wedge flank angle in these instances (hereinafter called the equivalent wedge flank angle) is defined as follows. In the cross-section of the annular wedge, a line segment q is derived which makes the area bounded by a line segment m, which passes through the pointed end of the wedge (the midpoint of $\epsilon$ in FIG. 6) and extends perpendicular to the roll axis, the contour n of the wedge flank, formed by the bent line or the curved line, and a bottom line p of the wedge flank equal to an area defined by m and q, and line p. The angle formed between the line segment q and the line segment m perpendicular to the roll axis is defined as the equivalent wedge flank angle $\theta_{e1}$ or $\theta_{e2}$. In the embodiment of FIG. 7, the outer wedge flank angle $\theta_1$ is greater than the equivalent inner wedge flank angle $\theta_{e2}$. In the embodiments of FIGS. 8a and 8b, the equivalent outer wedge flank angle $\theta_{e1}$ is greater than the equivalent inner wedge flank angle $\theta_{e2}$. In the annular wedge of FIG. 8a, both inner and outer flanks are convex. The annular wedge of FIG. 8b has a concave outer flank and a convex inner flank.

The metal piece to be cut must be held at a high temperature so that the annular wedge can easily cause plastic deformation to form a wedge-shaped groove therein. When the metal piece is steel, the preferable cutting temperature ranges between approximately 700 and 1300° C. When the metal piece is continuous-cast, the piece is supplied directly from the continuous casting machine to the cutting apparatus to permit the piece to be cut before getting cold. If cooled down, the metal piece should be reheated in a soaking pit furnace etc. to a temperature suited for the cutting.

Figure 9:
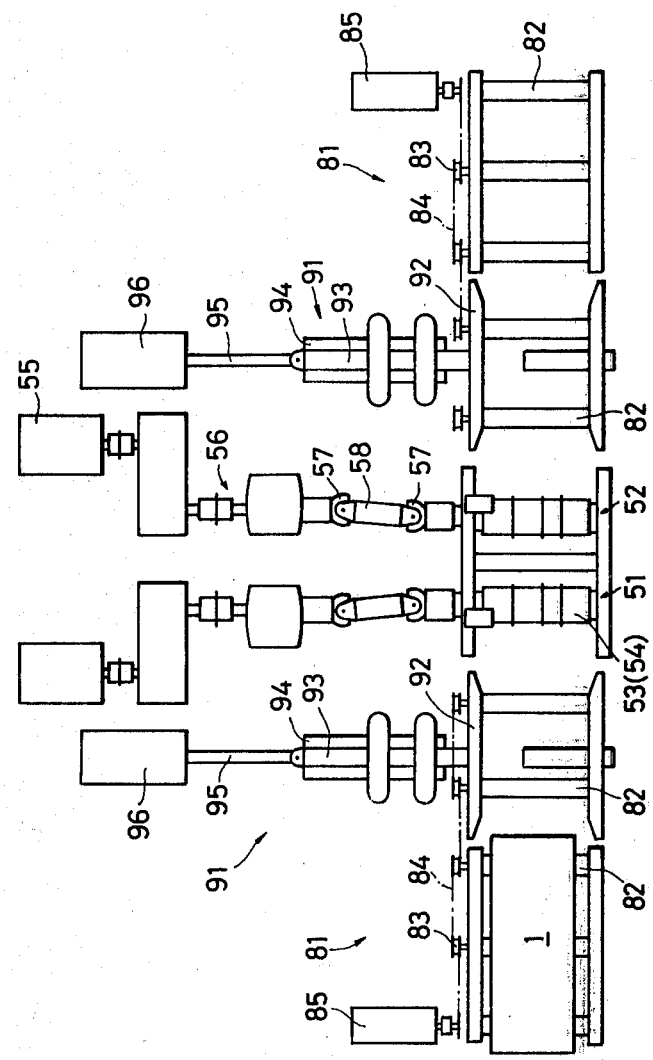
FIG. 9 is a plan view of an embodiment of a metal piece cutting apparatus according to this invention.

FIG. 9 shows a metal piece cutting apparatus according to this invention, which comprises principally knifing roll stands 51 and 52, a transfer apparatus 81 and a guide apparatus 91.

As shown, two knifing roll stands 51 and 52 are disposed in tandem. Knifing rolls 53 and 54 in each stand are driven by a reversible motor 55 through a reduction gear 56, universal couplings 57 and spindle 58.

Figure 10:
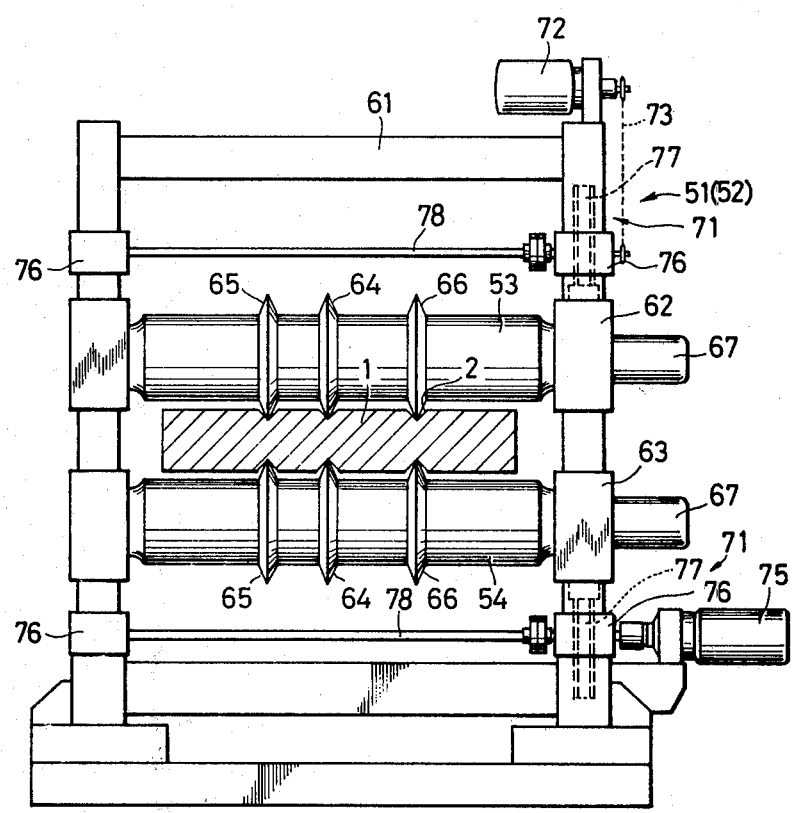
FIG. 10 is a front view of a knifing roll stand that makes up part of the apparatus shown in FIG. 9.

FIG. 10 is a front view showing details of the knifing roll stands 51 and 52. The paired knifing rolls 53 and 54, one above the other, are rotatably supported by bearing assemblies 62 and 63 mounted in a housing 61 so as to be movable up and down. The knifing rolls 53 and 54 each have three annular wedges 64, 65 and 66. On the two annular wedges 65 and 66 on both sides, the outer flank angle is greater than the inner flank angle, as described before. On the middle annular wedge 64, the outer and inner flank angles are equal to each other, and also to the inner flank angle on the outer annular wedges 65 and 66. The right end 67 of the roll is linked to the coupling 56.

The roll-to-roll clearance, or the depth of cut to be made in the metal piece by the annular wedges 64, 65 and 66, is adjusted by a known screwdown mechanism 71 attached to the housing 61. The screwdown mechanism 71 has a worm-gear jack 76 that is driven either by a motor 72 with a reduction gear through a chain transmission 73, or by a motor 75 with a reduction gear. By raising and lowering a screw 77 included therein, the worm-gear jack 76 moves the bearing assemblies connected to the screw 77 up and down. The worm-gear jack 76 is provided on each side, the paired worm-gear jacks being interlocked by a connecting rod 78.

Referring back to FIG. 9, the transfer apparatus 81 conveys the metal piece 1 in the longitudinal direction thereof and is provided on the entry and exit sides of the knifing roll stands 51 and 52. The transfer apparatus 81 comprises a plurality of rollers 82 spaced at appropriate intervals in the directions of transfer. The rollers 82 each have a sprocket 83, and are linked together by a chain 84 so as to be interlockingly driven by a reversible motor 85.

A guide apparatus 91 is also provided next to, and on the entry and exit sides of, the knifing roll stands 51 and 52. The guide apparatus 91 has a pair of guide plates 92 that are movable across the path of transfer, being connected to one end of a support member 93 which is square in cross-section. The support member 93 is slidably mounted on a guide rail 94, with the opposite end thereof linked to a drive unit 96 through a connecting rod 95.

The operation of the metal piece cutting apparatus is as follows. To begin with, the space between the knifing rolls 53 and 54 is set so that the cutting depth required in the first pass will be obtained. The roll gap on the second knifing roll stand 52 is made smaller than the one on the first stand 51, so that the wedge-shaped groove formed by the first stand 51 is deepened on the second stand 52.

To ensure cutting into exact widths, the metal piece 1 should be fed into the knifing roll stands 51 and 52 in the right position. For this purpose, the guide plates 92 are appropriately preset, by moving the guide apparatus 91 back and forth by the drive unit 96, so that the metal piece 1 is held in the right feeding position.

Then the transfer apparatus 81 is actuated to supply the metal piece 1 into the first and second knifing roll stands 51 and 52. In these stands 51 and 52, the annular wedges 64, 65 and 66 cut into the metal piece 1, from both top and bottom, to form wedge-shaped grooves 2.

By this means, the metal piece 1 is cut into the desired narrower widths. When the cutting is not accomplished in one pass, the knifing rolls 53 and 54 and the rollers 82 of the transfer apparatus 81 are reversed to send the metal piece 1 in the opposite direction. On thus, passing through the second and first stands 52 and 51 in that order, the wedge-shaped groove 2 in the metal piece 1 is deepened. The metal piece 1 is passed through the stands 51 and 52 repeatedly until the cutting is accomplished.

EXAMPLE

A metal piece was cut into three sections under the following conditions:
(1) Metal Piece
   Quality: Plain carbon steel
   Shape: Slab (200 mm thick, 1.5 m wide, and 6 m long)

Temperature: 1000° C.

(2) Knifing Rolls

Annular wedge flank angles (a) Annular wedge according to this invention ($\theta_1 > \theta_2$), identical in shape to that shown in FIG. 7.

Outer wedge flank angle $\theta_1 = 25$ degrees

Inner wedge flank angle $\theta_2 = 21$ degrees (equivalent angle)

(b) Conventional annular wedge ($\theta_1 = \theta_2$)

Outer wedge flank angle $\theta_1 = 23$ degrees

Inner wedge flank angle $\theta_2 = 23$ degree (3) Rolling Pass Schedule

| Pass No. | 1 | 2 | 3 | 4 |
| --- | --- | --- | --- | --- |
| Amount of Cut (Top and Bottom Totaled, in mm) | 70 | 60 | 40 | 28 |

Table 1 shows the results of the cutting performed under the above conditions.

TABLE 1

| Shape of Annular Wedge | Buildup on Middle Cut Section (mm) | Buildup on Cut Sections on Both Sides (mm) |
| --- | --- | --- |
| This Invention | 9.8 | 6.0 |
| Conventional | 9.6 | 8.5 |

As is evident from Table 1, the metal buildup of the thickness (designated as d in FIG. 2) is reduced greatly when the outer wedge flank angle $\theta_1$ is larger than the inner wedge flank angle $\theta_2$. In this example, the metal buildup decreased by 29 percent when the outer wedge flank angle $\theta_1$ was increased from 23 degrees to 25 degrees.

When flattened by being passed through the paired horizontal rolls (the condition shown in FIGS. 4c and 4c'), the cut section obtained by the conventional method had a curvature of 300 mm, while the curvature for the cut section obtained, according to this invention, was only 50 mm. This much curvature causes no operational problem in the subsequent rolling process.

What is claimed is:

1. An apparatus for cutting a relatively hot metal piece having a rectangular cross-section into three or more narrower widths by cutting through the thickness of said metal piece, which apparatus comprises: a knifing roll stand having a pair of rotatable knifing rolls, one placed above the other, each knifing roll having a plurality of annular wedges therearound and spaced from each other along the roll in the direction of the axis thereof, there being two of said wedges which are outer wedges, being closer to the respective ends of said roll, the flanks of said outer wedges being at an angle to a plane through the wedges and perpendicular to the axis of said knifing roll, the angle of the flank of the flanks of each of said outer wedges which is toward the roll end being an angle $\theta_1$ which is greater than the angle $\theta_2$ of the opposite flank of said outer wedges, the angle $\alpha$ of said outer wedges which is the sum of the angle $\theta_1$ and the angle $\theta_2$ being between 30 and 90 degrees, and the flank angle $\theta_1$ being equal to $0.52\alpha$ to $0.92\alpha$, and the pointed end of each outer wedge being flattened and having a width $\epsilon$ equal to 0.01H to 0.04H, where H is the maximum thickness of the metal piece to be cut in said stand, and means at the entry and exit sides of the knifing roll stand for transferring a metal piece to be cut through the stand in the longitudinal direction of the piece, whereby sufficient metal in the outermost cut widths and adjacent the cuts between the outermost cut widths and the next adjacent inner cut widths being caused to flow in the direction of the length of the cut widths to substantially eliminate the curvature in the direction of the width of the cut widths when the cut widths are rolled to rectangular cross-sectional shapes.

2. An apparatus as claimed in claim 1, further comprising means for guiding the metal piece to be cut and positioned next to said knifing roll stand, the guiding means having a guide plate movable back and forth transversely of the direction in which the metal piece to be cut is transferred by said transferring means.

* * * * *